United States Patent [19]

Koike

[11] Patent Number: 4,541,085
[45] Date of Patent: Sep. 10, 1985

[54] SIMPLE ACOUSTIC PLAYBACK DEVICE FOR A RECORD HAVING PLURALITY OF RECORDING GROOVES

[75] Inventor: Eishi Koike, Sagamihara, Japan

[73] Assignee: Ozen Corporation, Tokyo, Japan

[21] Appl. No.: 619,550

[22] Filed: Jun. 11, 1984

[30] Foreign Application Priority Data

Sep. 30, 1983 [JP] Japan ................................. 58-182335

[51] Int. Cl.[3] .......................... G11B 3/20; G11B 31/00; A63H 3/33
[52] U.S. Cl. .......................................... 369/65; 369/31; 369/67
[58] Field of Search .................... 369/63, 65, 67, 66, 369/31

[56] References Cited

U.S. PATENT DOCUMENTS

| | | | |
|---|---|---|---|
| 3,712,629 | 1/1973 | Watanabe | 369/63 |
| 3,721,449 | 3/1973 | Sirinek | 369/63 |
| 3,799,556 | 3/1974 | Watanabe | 369/63 |
| 4,361,882 | 11/1982 | Watanabe | 369/30 |
| 4,404,667 | 9/1983 | Koike | 369/65 |
| 4,404,668 | 9/1983 | Watanabe | 369/65 |
| 4,482,990 | 11/1984 | Koike | 369/63 |

Primary Examiner—Steven L. Stephan
Attorney, Agent, or Firm—Basile Weintraub Hanlon

[57] ABSTRACT

An acoustic playback device includes a plurality of selector bars equal to the number of recording grooves, a plurality of biased stylus-pressure releasing bars, the bars moving against the force of the associated spring as the corresponding selector bar is pushed into engagement with a stopper pin on the record disc to bring the introductory portion of the selected recording groove to a position where it can be engaged by a pickup. A latch plate is axially spaced from the reverse side of the record disc unit. An annular vertical wall is formed on the surface of the latch plate facing the record disc unit. Hooks on the stylus-pressure releasing bars engage the vertical wall when the stylus-pressure releasing bars are moved forward. Stylus-pressure releasing portions formed on the ends of the stylus-pressure releasing bars engage the stopper pin when advanced with the stylus-pressure releasing bars. Cam surfaces on the stylus-pressure releasing portions and the stopper pin cause the record disc to disengage the hook of the stylus-pressure releasing bar from the vertical wall and permit return movement of the stylus-pressure releasing bars. Tapered surfaces between the stylus-pressure releasing bars and the peripheral edge of the latch plate create a cam action such that a forward movement of the stylus-pressure releasing bar against the force of the spring causes the latch plate with the record disc unit to move away from the sound transmitting plate.

1 Claim, 7 Drawing Figures

SIMPLE ACOUSTIC PLAYBACK DEVICE FOR A RECORD HAVING PLURALITY OF RECORDING GROOVES

BACKGROUND OF THE INVENTION

1. Field of the Invention

The present invention relates to a simple acoustic playback device for a record disc having a plurality of recording grooves.

2. Description of the Prior Art

A simple acoustic playback device for selective playback from a record disc having a plurality of recording grooves has been developed and disclosed in Japanese Patent Publication No. 19763/1986 corresponding to U.S. Pat. No. 3,712,629 and British Pat. No. 1336749.

In the operaton of this device, as a selector bar is pushed, the bar presses a tapered surface of a stylus-pressure releasing wheel to rotate the latter, so that the stylus pressure releasing rod carried by the releasing wheel is moved together with the wheel to lift the speaker unit and reset the pickup at the starting point of playback on the recording surface of the record disc unit. The selector bar, on the other hand, retains a stopper pin provided on the record disc unit to temporarily stop the rotation of the record disc unit such that a selected recording groove is brought to a position where it can be engaged by the pickup at the playback starting position. As the selector bar is released from the pressing force, the stylus-pressure releasing bar is retracted together with the stylus-pressure releasing wheel to free the speaker unit so that stylus pressure is applied to the pickup.

This device has a drawback in that the pickup may erroneously receive stylus pressure during its movement to the playback starting position and thereby failing to select the desired recording groove unless the user continues to push the selector bar until it is engaged by the stopper pin.

The timing of the engagement between the stopper pin and the selector bar differs depending on the position of the stopper pin and the position of the selector bar such that the user cannot predict the exact time of engagement. This type of simple acoustic playback device, therefore, is unsatisfactory insofar as reliability of the selecting operation and quickness of handling.

In addition, in the conventional simple acoustic playback device having a plurality of recording grooves, the speaker unit has to be stationarily fixed in the casing due to the use of the stylus pressure releasing wheel. On the other hand, the acoustic playback device movably mounting the speaker unit cannot be suitably used in such an apparatus since it is subjected to comparatively strong vibration. In recent years, however, there is a trend for mounting the acoustic playback device having a plurality of recording grooves on automobiles or the like. This in turn gives a rise to the demand for an acoustic playback device having a speaker unit mounted stationarily on the casing and capable of suitably playing back a record disc having a plurality of recording grooves.

SUMMARY OF THE INVENTION

The invention aims at obviating the above-described problems of the prior art.

Therefore, an object of the invention is to provide a simple acoustic playback device capable of selecting and playing back a desired one of several recording groove.

Another object of the invention is to provide a simple acoustic playback device which permits quick playback selection of the recording grooves.

Still another object of the invention is to provide a playback selecting mechanism having a simple construction.

A further object of the invention is to provide an acoustic playback device having a speaker unit stationarily mounted therein which is usable in combination with a record disc having a plurality of recording grooves.

The present invention proposes an improvement in an acoustic playback device for use in combination with a record disc unit having a recording surface provided with a plurality of recording grooves. The device has a plurality of selector bars corresponding in number to the number of recording grooves, a plurality of stylus-pressure releasing bars normally biased backwardly by means of springs, the bars being adapted to be moved against the force of the associated spring as the corresponding selector bar is pushed into engagement with a stopper pin on the record disc unit to thereby bring the introductory portion of the selected recording groove to a position where it can be engaged by a pickup.

A playback finish switch is disposed on the playback final position of the record disc unit and is adapted to cut the supply of power to the driving motor when the pickup has reached the playback final position after completion of the playback. A latch plate is made unitary with the record disc unit and is axially spaced from the reverse side of the record disc unit. The latch plate is provided on its surface facing the record disc unit with an annular vertical wall directed to the center of the record disc unit. Hooks are formed on the stylus-pressure releasing bars. The hooks are adapted to engage the vertical wall when the stylus-pressure releasing bars are moved forwardly by the force of the springs.

Stylus-pressure releasing portions are provided on the ends of the stylus-pressure releasing bars and are adapted to engage the stopper pin on the record disc unit when moved ahead together with the stylus-pressure releasing bars. Tapered surfaces are provided between the stylus-pressure releasing bar and the latch plate to make such a cam action as to drive, when the stylus-pressure releasing bar is moved ahead against the force of the associated spring, the latch plate together with the record disc unit away from the sound transmitting plate. This arrangement is such that, as the latch plate is moved together with the record disc unit away from the sound transmitting plate by the stylus pressure releasing bar, the pickup is released from stylus pressure such that it is allowed to be reset to the playback start position by the force of the reset spring. At the same time, the playback finish switch is turned on to restart the motor and cause rotation of the record disc unit.

Tapered surfaces are also formed between the stylus-pressure releasing portions and the stopper pin to create a cam action such that further rotation of the stopper pin after making engagement with the stylus-pressure releasing portions on the stylus-pressure releasing bar causes the record disc unit to move away from the sound transmitting plate and disengage the hook of the stylus pressure releasing bar from the vertical wall. This permits the stylus-pressure releasing bars to be returned by the force of the springs.

According to this arrangement, even if the selector lever for the selective playback is released immediately after its initial pressing, the hook of the corresponding stylus-pressure releasing bar is retained in position by the vertical wall of the latch plate to thereby prevent the stylus-pressure release bar from being retracted by the force of the associated spring. Thus, the latch plate and the record disc unit are kept away from the sound transmitting plate against the force of the stylus spring to keep the pickup free from stylus pressure until the stopper pin is rotated into engagement with the stylus-pressure releasing bar.

As the stopper pin, which is in the engagement with the stylus-pressure releasing bar, is rotated further, the tapered surfaces through which these members engage, perform a cam action to move the latch plate rearwardly to thereby disengage the hook of the stylus-pressure releasing bar from the vertical wall. At this time, the selector bar has been released from the pressing force and reset the force of the spring so that the stylus-pressure releasing bar can be returned to its initial position by the force of the associated spring. Thus, the record disc unit is kept at the retracted position overcoming the force of the stylus pressure spring for a time period long enough to ensure the returning of the pickup to the playback start position and until the stylus pressure bar is released from engagement by the stopper pin. Consequently, according to the present invention, it is possible to ensure the completion of the selecting operation, and the selecting operation can be quickened because the selector bar need not be pressed for long time.

DESCRIPTION OF THE PREFERRED EMBODIMENTS

Figure 1:
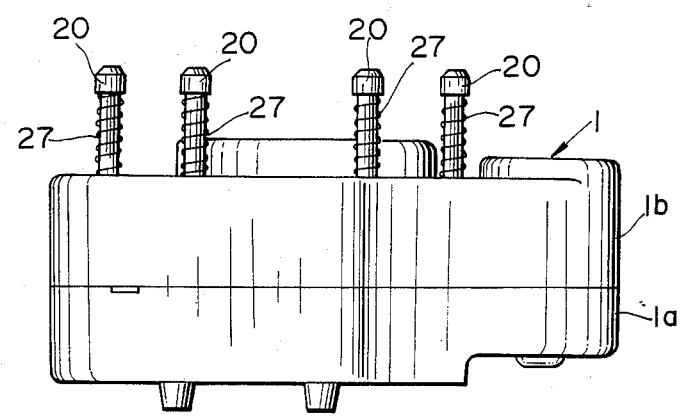
FIG. 1 is a front elevational view of an acoustic playback device embodying the present invention.
Figure 2:
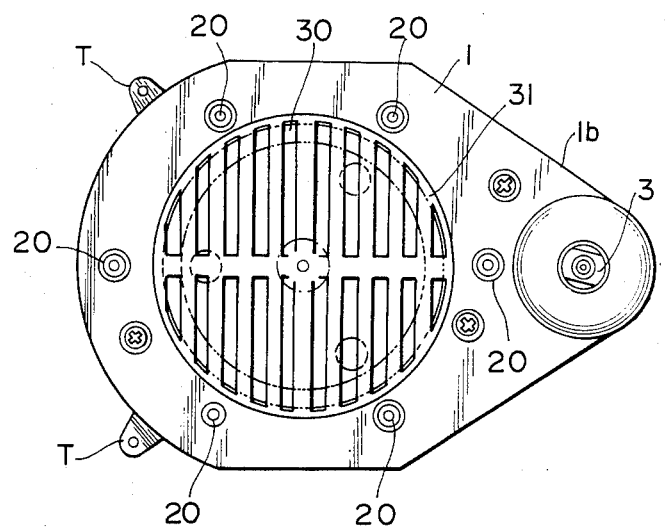
FIG. 2 is a plan view of the playback device shown in FIG. 1.

FIGS. 1 and 2 show a one embodiment of simple acoustic playback device embodying the present invention. The device has a casing 1 formed of a chassis portion 1a and a housing portion 1b which overlays the chassis portion 1a. A speaker box 31 having slits 30 for transmitting the reproduced sound is formed on the upper surface of the housing portion 1b of the casing 1. Six selector bars 20 project from the upper surface of the housing portion 1b so as to surround the speaker box 31. These selector bars 20 are adapted to be moved inwardly and outwardly of the casing 1 and are normally biased outwardly of the casing 1 by means of springs 27.

Figure 3:
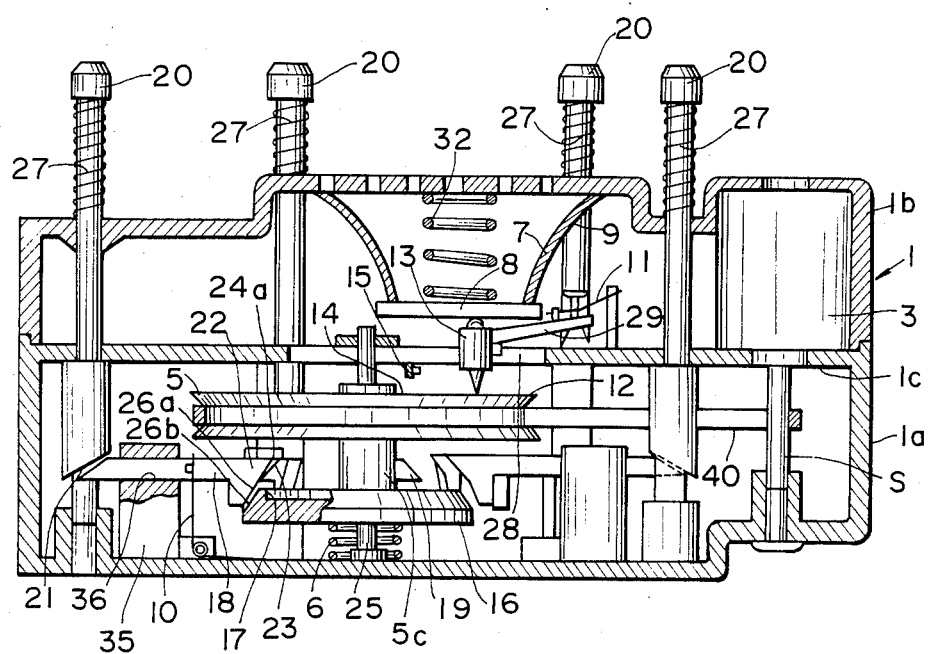
FIGS. 3 and 4 are vertical, sectional, front, elevational views showing the device in the operating condition.
Figure 4:
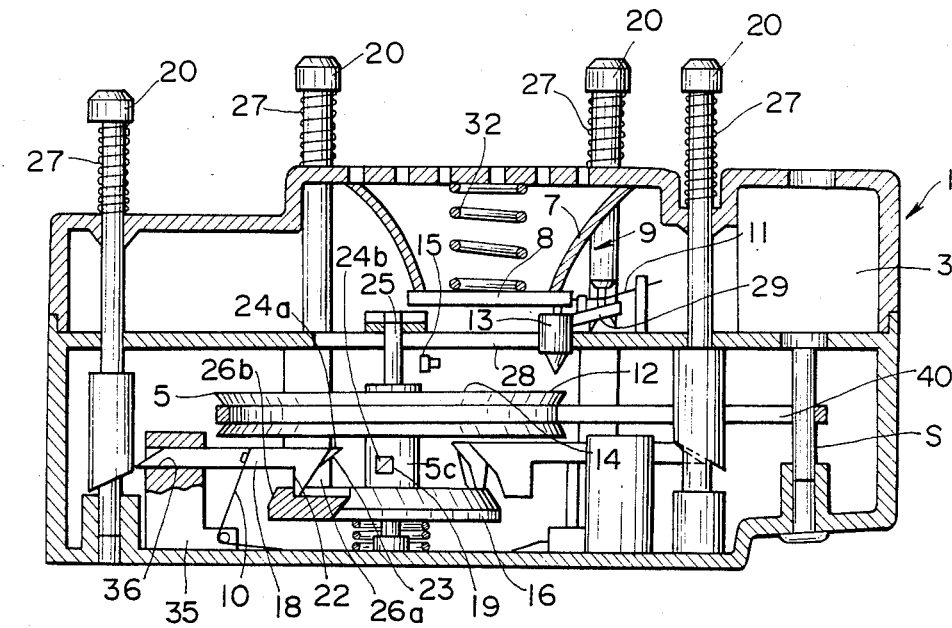

FIGS. 3 and 4 show the internal structure of this device. As will be seen from these figures, an intermediate plate 1c is mounted on the chassis 1a and is covered by the housing 1b. A tone arm 29 pivotally carried at its rear end by the intermediate plate 1c is provided at its free end with a pickup 13. A motor 3 fixed to the upper surface of the intermediate plate 1c near lateral side of the intermediate plate 1c has an output shaft S directed to the bottom of the chassis 1.

A speaker unit 9 is stationarily secured to the rear side of the speaker box 3 formed on the housing 1b so as to take a position above the intermediate plate 1c. Reference numeral 32 designates a supporting spring for the speaker unit 9. The speaker unit 9 is composed of a speaker cone 7 and a sound transmitting plate 8 fixed to the apex of the speaker cone 7. The pickup 13 slidingly supports the sound transmitting plate 8.

Referring to the drawings, reference numeral 15 designates a playback finish switch mounted on the intermediate plate 1c. The playback finish switch 15 is disposed in the electric circuit for the motor 3 and is adapted to cut the electric power supply to the motor 3 when the pickup 13 has been moved to the final position after completion of sound playback. The switch 15 is connected to a terminal T projecting to the outside of the casing 1. Reference numeral 28 denotes a pickup passage hole through which the pickup 13 extends to the lower side of the intermediate plate 1c.

Figure 5:
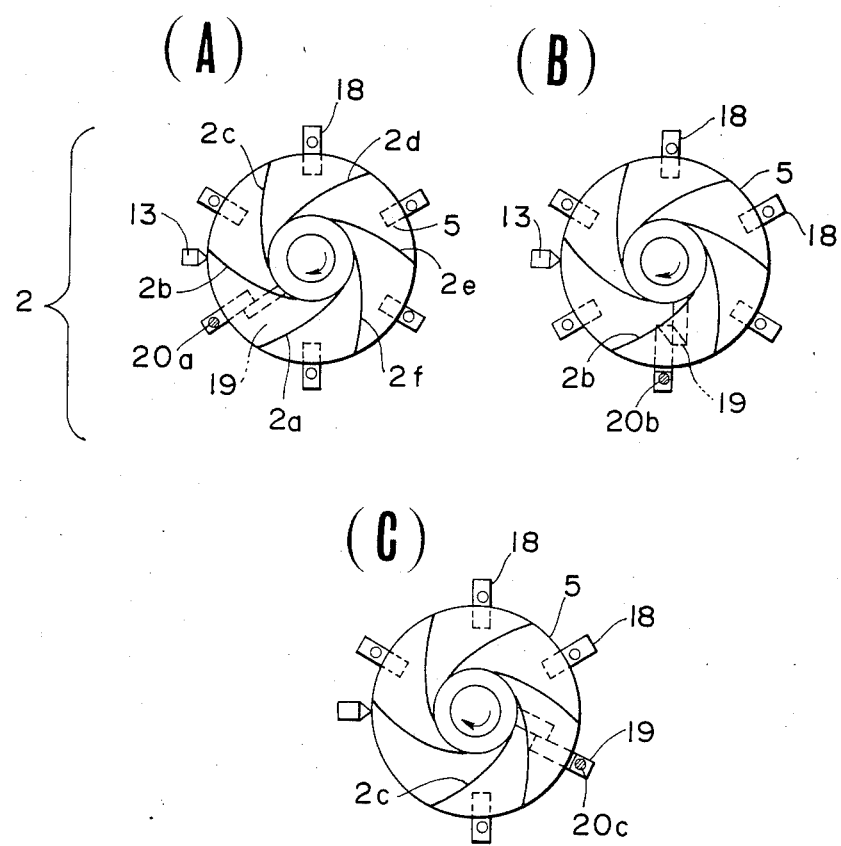
FIGS. 5A, 5B and 5C are plan views of a record disc unit.

In the drawing, reference numeral 5 denotes a record disc. As will be clearly seen in FIG. 5 the record disc 5 has six recording grooves 2. Thus, the recording grooves 2 correspond in number to the number of selector bars 20. The pickup 13 is continually biased by a reset spring 11 towards the playback starting position 12 on the recording surface and away from the recording surface on the record disc. The reset spring 11 is wound around the rear end of the tone arm 29 to pivotally support the tone arm 29. The playback finish switch 15 is mounted at a playback finish point 14 near the center of the record disc unit 5.

Referring specifically to FIG. 4, a center pin 25 stands up from the center of the chassis 1a. The record disc unit 5 is rotatably carried on and axially movable on the center pin 25. The record disc unit 5 is comprised of a record disc member 5a and a turntable member 5b. The turn table member 5b is disposed on the rear side of the record disc member 5a and has a peripheral edge serving as a pulley. An elastic belt 40 is reeved around the pulley and the output shaft S of the motor 3. A hub 5c is integrally formed on the reverse side of the turntable member 5b.

Through the hub 5c, a latch plate 16 is integrally connected to the record disc unit 5 at a position spaced from the turn table 5b. The latch plate 16 has a circular form with its outer peripheral edge tapered at 26b to be directed radially outwardly and towards the record disc unit 5. The upper surface of the hub 5c has a recess starting at a point spaced radially inward from the tapered surface 26b to form a vertical wall 17. A stopper pin 19 is provided on the outer peripheral surface of the hub 5c and extends radially outwardly therefrom. A tapered surface 24b is provided on the end of the stopper pin 19 and is directed upwardly and in the direction of rotation of the record disc unit 5.

On the other hand, each selector bar 20 is provided on the portion thereof housed by the casing 1 with a tapered surface 21 directed towards the center of the record disc unit 5 and the bottom of the chassis portion 1a. A stylus-pressure releasing bar 18 is disposed to oppose the tapered surface 21 on each selector bar 20.

As in the case of the selector bar 20, the stylus-pressure releasing bar 18 corresponds in number to the numher of the recording grooves 2 in the record disc unit 5. Thus, there are six stylus-pressure releasing bars 18. The stylus pressure releasing bars 18 are mounted on a bearing which is formed in an upper part of a stem 35 standing upright in the casing 1 so as to oppose the peripheral surface of the hub shaft 5c. The stylus-pressure releasing bars 18 are movable only in back and forth directions. One end of the bars 18 are provided with a tapered surface 26a opposing the tapered surface 26b of the latch plate 16 and includes a hook 22 opposing the vertical wall 17 of the latch plate 16. A stylus-pressure releasing portion 23 is formed on the end of the stylus-pressure releasing bar 18 and includes a tapered surface 24a directed in a direction opposite to the direction of rotation of the record disc unit 5 and opposite to the latch plate 16. In the drawing, a reference numeral 10 designates a spring for normally biasing the stylus-pressure releasing bar 19 in a backward direction.

A stylus-pressure spring 6 is disposed between the reverse side of the latch plate 16 and the bottom plate of the chassis 1a and is wound around the center pin 25. The record disc unit 5 is supported in a direction toward the sound transmitting plate 8 through the latch plate 16 and the hub 5c.

The device of the present invention operates as follows. The pickup 13 after playback along one of the recording grooves 2 is positioned at the playback final position 14 so that the playback finish switch 15 is opened to cut the supply of electrical power to the motor 3. As one 20a of the selector bars 20 is pressed, as shown in FIG. 5A, the tapered surface 21 of this bar presses upon the corresponding stylus-pressure releasing bar 18. Consequently, the stylus-pressure releasing bar 18 is moved in a forward direction so that the tapered surface 26a formed on the end of the bar 18 pushes the tapered surface 26b on the latch plate 16 such that the later is moved away from the sound transmitting member 8 overcoming the force of the stylus-pressure spring 6.

As the stylus-pressure releasing bar 18 moves further ahead, the hook 22 is brought into engagement with the latch plate 16 so that the bar 18 is prevented from returning, even after the release of the selector bar 20. The record disc unit 5 is moved in the same direction and together with movement of the latch plate 16 so that the recording surface is moved away from the pickup 12. Consequently, the stylus-pressure acting on the pickup 13 is eliminated such that the pickup 13 is allowed to move towards the playback start position 12 on the record disc unit 5 by the force of the reset spring 11.

Thus, the record disc unit 5 is held apart from the sound transmitting member 8, so that the stylus pressure is eliminated over a time period sufficient to perfectly reset the pickup 13 at the playback start position.

As the pickup 13 leaves the playback final position 14, the playback finish switch 15 is closed to allow the supply of electrical power to the motor 3. Accordingly, the motor 3 starts to rotate the record disc unit 5. As a result, the stopper pin 19 rotates together with the hub 5c until it contacts the stylus-pressure releasing bar 18 and pushed by the selector bar 20a. As the stopper pin 19 contacts the stylus-pressure releasing portion 23, the aimed recording groove 2a of the record disc unit 5 is positioned for engagement by the pickup 13. As the stopper pin 19 is rotated further after abutment with the stylus-pressure releasing portion 23, the latch plate 16 is moved away from the sound transmitting member 16 by the cam action provided by the tapered surfaces 24b, 24a so that the vertical wall 17 is disengaged from the hook 22.

Consequently, the stylus-pressure releasing bar 18 is retracted to the starting position by the force of the spring 10 so that the latch plate 16 is allowed to move together with the record disc unit 5 towards the sound transmitting plate 8 by the force of the stylus-pressure spring 6. After resetting of the record disc unit 5, stylus-pressure is applied again to the pickup 13 which is stationed at the playback start position and ready for engagement with the selected recording groove 2b.

The operation of another embodiment for selecting a recording groove is as follows. As the record disc unit 5 rotates in the direction of the arrow in FIG. 5A, the stopper pin 19 is stopped by the portion 20a shown in section of the selector bar 20a.

The selecting bar 20a is positioned in relation to the introductory position of the recording groove, as designated at 2a, out of the recording grooves 2, such that, when the record disc unit 5 is rotated further, the introductory part of the recording groove can be engaged by the pickup 13. In the case of FIG. 5B also, the positional relationship is so determined that, when the selector bar positioned at 20b is pushed, the recording groove designated at 2b is engaged by the pickup 13. The same positional relationship exists also between the selector bar 20c and the recording groove 2c shown in FIG. 5C.

As the selector bar 20 is pushed, the stylus-pressure releasing bar 18 is moved ahead to cause the latch plate 16 to move together with the record disc unit 5 and thereby eliminate stylus pressure. At the same time, the pickup 13 is returned towards the playback start position by the force of the reset spring 11. Then, as the stylus-pressure releasing bar 18 is moved further, the hook 22 rests on the vertical wall 17 of the latch plate 16 to thereby hold the latter against the force of the stylus-pressure spring 6. As a result, the pickup 13 is kept free from stylus pressure, without fail, until the pickup 13 is returned to the playback start position 12.

Then, as the stopper pin 19 is rotated together with the record disc unit 5 into contact with the stylus-pressure releasing portion 23, the record disc unit 5 is temporarily stopped at the position where the desired one of the recording grooves 2 corresponds to the selected selector bar 20. As the stopper pin 19 rotates further, the tapered surface 24b of the stopper pin 19 presses against the tapered surface 24a of the stylus-pressure releasing portion 23 to move the latch plate 16 along the center pin 25 away from the sound transmitting plate 8 and thereby allow a return movement of the stylus-pressure releasing bar 18. As a result, the latch plate 16 is released and moves along the center pin 25 towards the sound transmitting plate 8. Consequently, stylus-pressure is applied to the pickup 13 which is in position for selecting the desired recording groove 2.

What is claimed is:
1. An acoustic playback device including:
a casing;
a record disc having a recording surface with a plurality of recording grooves, the record disc being rotationally supported within the casing;
a sound transmitting plate;
a speaker cone;
a speaker unit stationarily mounted above the record disc and containing the sound transmitting plate and the speaker cone;
a pickup located between the sound transmitting plate and recording disc unit;
a stylus-pressure spring exerting pressure on the pickup;

a reset spring biasing the pickup toward a playback start position on the record disc and away from the recording surface of the record disc;

a motor;

a playback finish switch for disconnecting power to the motor when the pickup is moved to the playback start position;

stylus-pressure releasing bars for removing the record disc from contact with the pickup;

a stopper pin projecting radially outward from the record disc;

a plurality of selector levers corresponding to the number of recording grooves, the selector levers contacting the stylus-pressure releasing bars to bring the stylus-pressure releasing bar into contact with the stopper pin which stops rotation of the record disc and brings the selected recording groove into a start position;

selector bar biasing means for outwardly and backwardly biasing the selector levers away from the axis of rotation of the record disc wherein the improvement comprises:

a latch plate unitary with the record disc and axially spaced from the reverse side of the record disc, the latch plate having an annular vertical surface facing the record disc and directed to the center of the recording disc;

hooks formed on the stylus-pressure releasing bars engagably contacting the annular vertical surface upon forward motion of the stylus-pressure releasing bars;

stylus-pressure releasing portions located on the ends of the stylus-pressure releasing bars capable of engagably contacting the stopper pin of the record disc when the record disc is moved ahead sychronous with the stylus-pressure releasing bars; and tapered surfaces formed between the stylus-pressure releasing portion and the stopper pin and adapted to cause a cam action allowing further rotation of the stopper pin after making engagement with the stylus-pressure releasing portion to cause the record disc to move away form the sound transmitting plate thereby disengaging the hook of the stylus-pressure releasing bar from the vertical wall and permitting the stylus-pressure releasing bars to be returned by the force of the springs to their original position;

the tapered surfaces between the stylus-pressure releasing bars and the peripheral edge of the latch plate being taperedly adapted to create a cam action that a forward movement of the stylus-pressure releasing bar against the force of the spring causes the latch plate to rotate together with the disc unit away from the sound transmitting plate.

* * * * *